United States Patent [19]

Nakayama et al.

[11] Patent Number: 5,303,100
[45] Date of Patent: Apr. 12, 1994

[54] MAGNETIC DISK DEVICE WITH FLOATING-TYPE MAGNETIC HEAD

[75] Inventors: Junichiro Nakayama; Hiroyuki Katayama; Tomoyuki Miyake; Kenji Ohta, all of Nara, Japan

[73] Assignee: Sharp Kabushiki Kaisha, Osaka, Japan

[21] Appl. No.: 752,052

[22] Filed: Aug. 29, 1991

[30] Foreign Application Priority Data

Sep. 7, 1990 [JP] Japan .................................. 2-237867

[51] Int. Cl.$^5$ .............................................. G11B 5/55
[52] U.S. Cl. .................................. 360/104; 360/109; 360/114; 360/105; 360/103; 360/75
[58] Field of Search ............. 360/75, 78.04, 78.07, 360/103, 105, 109, 104, 114

[56] References Cited

U.S. PATENT DOCUMENTS

| | | | |
|---|---|---|---|
| 4,589,036 | 5/1986 | Bertschy et al. | 360/75 |
| 4,755,896 | 7/1988 | Okutsu | 360/103 |
| 4,807,062 | 2/1989 | Onodera | 360/75 |
| 4,807,072 | 2/1989 | Ono et al. | 360/75 |
| 4,901,175 | 2/1990 | Ito et al. | 360/103 |
| 4,907,106 | 3/1990 | Yamada | 360/78.04 |
| 4,969,057 | 11/1990 | Inomata et al. | 360/75 |
| 4,987,502 | 1/1991 | Freeze | 360/69 |
| 5,081,553 | 1/1992 | Wanlass et al. | 360/103 |

FOREIGN PATENT DOCUMENTS 62212 3/1990 Japan .
853662 8/1981 U.S.S.R. .

OTHER PUBLICATIONS

Kawakubo, "Wear Process of Coated Magnetic Disk during Contact Start/Stop Operation And Its Accelerated Test Method" Research Materials of the 46th Applied Magnetics Seminar. 1986, pp. 21-28.

"Study on Liquid Lubricants for Magnetic Disks". 34th National Seminar for Japan Society for Lubrication. 1989.

Primary Examiner—Timothy P. Callahan
Attorney, Agent, or Firm—David G. Conlin; Robert F. O'Connell; Peter F. Corless

[57] ABSTRACT

A magnetic disk device having a floating-type magnetic head, for use with a disk-shaped recording medium having a sliding area for the floating-type magnetic head formed outside a recording area. The length in the disk radial direction of a suspension supporting the floating-type magnetic head is varied depending on individual magnetic disk devices. In another arrangement, a control means is provided for setting two reference values so that a radial position of the floating-type magnetic head detected by a detection section is compared with these reference values, and for alternating one of the preset reference values to the other reference value upon receiving a rotation stop signal. In still another arrangement, control means is provided, whereby a radial position for sliding of the floating-type magnetic head is randomly varied within the sliding area. According to these arrangements, since the radial position for sliding of the floating-type magnetic head is varied within the sliding area without being located at the same position, abrasion within the sliding area can be dispersed. As a result, it becomes possible to extend the longevities of the floating-type magnetic head and the recording medium.

16 Claims, 12 Drawing Sheets

MAGNETIC DISK DEVICE WITH FLOATING-TYPE MAGNETIC HEAD

FIELD OF THE INVENTION

The present invention relates to a magnetic disk device provided with a floating-type magnetic head, which records and reproduces information optically or magnetically.

BACKGROUND OF THE INVENTION

As illustrated in FIG. 8, a magneto-optical disk device, as one of the magnetic disk devices provided with a floating-type magnetic head, has a floating-type magnetic head 3 and an optical head 7 which are disposed opposite to each other with a magneto-optical disk 4 situated in between, and a motor 5 for rotating the magneto-optical disk 4. The floating-type magnetic head 3 is provided with a miniaturized magnetic head 1 fixed to a floating slider 2 that is supported by a suspension 6, and adapted to float above the magneto-optical disk 4 with a substantially constant floating height of several $\mu$m to several tens $\mu$m as the magneto-optical disk 4 rotates. The floating height is determined by a balance between an upward lift caused by air flowing between the magneto-optical disk 4 and the floating slider 2 and a downward depressing force by the suspension 6. In addition, the magneto-optical disk 4 includes, for example, a substrate 4a, a recording layer 4b having a vertically magnetized film and a protection layer 4c.

With the floating-type magnetic head 3 floating above the magneto-optical disk 4, a light beam from the optical head 7 is converged on the recording layer 4b to cause a temperature rise. On the other hand, a magnetic field driving current is supplied to the magnetic head 1 by a driver circuit 8, and thus a magnetic field alternately changing its direction between upward and downward (which directions are perpendicular to the recording surface of the magneto-optical disk 4) is applied to the magneto-optical disk 4. Consequently, new information can be recorded by an overwriting operation of the magnetic field modulation recording method which obviates the necessity of erasing operations for already recorded information.

Meantime, for commonly used magneto-optical disk devices, so-called contact start/stop method (hereinafter, referred to simply as CS/S method) is adopted in the floating operation of the floating-type magnetic head 3. According to the CS/S method, the floating slider 2 is in contact with the surface of the magneto-optical disk 4 during stopping of the rotation of the magneto-optical disk 4, and upon starting of the rotation of the magneto-optical disk 4, the floating slider 2 starts sliding on the magneto-optical disk 4 to float. When the rotation of the magneto-optical disk 4 is stopped, the floating slider 2 slides on the magneto-optical disk 4 to return to the contact state with the magneto-optical disk 4.

Here, in order to protect the recording layer 4b from damage due to friction caused when the floating slider 2 slides on the protection layer 4c, our Japanese Unexamined Patent Application (see Tokuganhei 1-288321) teaches a magneto-optical disk device wherein a sliding area for the floating slider 2 is provided in a predetermined area not having the recording layer 4b.

In this case, after forming a protection layer 4c, it is preferable to apply a lubricant to the protection layer 4c in order to reduce friction between the floating-type magnetic head 3 and the protection layer 4c.

However, in the above arrangement, the repetitive sliding operations of the floating slider 2 cause the lubricant to be consumed or removed from the sliding area because of friction between the floating slider 2 and the lubricant. This results in such a drawback that the floating slider 2 may stick to the sliding area or the magnetic head 1 may be damaged.

FIG. 9 schematically illustrates a surface condition of the sliding area whereon 30,000 times of the sliding operations have been performed by the floating slider 2. In FIG. 9, there remains sufficient lubricant in areas A; only a little lubricant in areas B; and almost no lubricant in areas C. On the other hand, FIG. 10 schematically illustrates a surface condition of the floating slider 2 with respect to the area opposite to the sliding area after having performed 30,000 times of the sliding operations. There is lubricant, removed from the sliding area, adhering to an area D indicated by hatching. Especially, there is a lot of lubricant adhering to side edge portions that are parallel to the lengthwise direction of the floating slider 2. These side edge portions correspond to the areas C in FIG. 9, having almost no lubricant.

As described above, in the arrangement of the magneto-optical disk device for permitting the sliding operation of the floating slider 2 to be performed on the sliding area provided outside the recording area, although damage of the recording layer 4b can be sufficiently reduced, problems such as sticking of the floating slider 2 and damage of the magnetic head 1 still remain unsolved.

SUMMARY OF THE INVENTION

It is an object of the present invention to provide a magnetic disk device wherein, in performing a CS/S operation of a floating slider on a sliding area provided outside a recording area of a disk, abrasion and removal of lubricant applied to the sliding area can be reduced by varying a radial position at which the CS/S operation is to be performed, thereby preventing sticking of the floating slider and damage of a magnetic head.

In order to achieve the above object, the magnetic disk device of the present invention is characterized in permitting sliding operations of the floating-type magnetic head to be performed within the sliding area provided outside the recording area on the magnetic disk upon starting the rotation of the magnetic disk and stopping the rotation thereof, and in varying within the sliding area a radial position at which the floating-type magnetic head performs a sliding operation.

Here, the magnetic disk device described above may be commonly used magnetic disk devices for magnetically recording and reproducing on and from the magnetic disk, or may be magneto-optical disk devices which project light through the optical head on the magneto-optical disk during recording or reproduction.

As more concrete examples of the arrangement, in the case where a magnetic disk removable from a magnetic disk device is applicable to a plurality of magnetic disk devices, an installation position of the suspension of the floating-type magnetic head may be varied depending on the individual magnetic disk devices in order to vary a radial position for sliding of the floating-type magnetic head within the sliding area.

Further, the magnetic disk device may be provided with a control means which, for example, alternately changes a radial position for starting sliding and a radial position for stopping sliding of the floating-type magnetic head between two radial positions preliminarily determined.

Moreover, the magnetic disk device may be provided with a control means which is adapted to randomly vary radial positions for sliding of the floating-type magnetic head within the sliding area.

According to the above-mentioned arrangement of the magnetic disk device, since the radial position for sliding of the floating-type magnetic head is varied within the sliding area without being located at the same position, abrasion within the sliding area can be dispersed. As a result, abrasion loss is reduced more than that of the fixed radial position for sliding, thereby making it possible to extend the longevities of the floating-type magnetic head and magnetic disk.

For a fuller understanding of the nature and advantages of the invention, reference should be made to the ensuing detailed description taken in conjunction with the accompanying drawings.

BRIEF DESCRIPTION OF THE DRAWINGS

FIGS. 1 through 3 show one embodiment of the present invention.

FIG. 2 is a plan view showing an essential part of the magneto-optical disk device of FIG. 1(a).

FIG. 3 is a perspective view of a floating-type magnetic head.

FIG. 4 is an explanatory drawing showing a schematic structure of a magnetic disk device.

FIG. 5 is a plan view showing an essential part of the magnetic disk device of FIG. 4.

FIG. 6 is an explanatory drawing showing a schematic structure of a magneto-optical disk device.

FIG. 7 is a plan view showing an essential part of the magneto-optical disk device of FIG. 6.

FIG. 8 is a schematic side view of a magneto-optical disk device.

FIG. 9 is a plan view schematically showing a state of residual lubricant applied to the surface of the magneto-optical disk.

FIG. 10 is a plan view schematically showing a state of lubricant adhering to the bottom face of a floating slider.

DESCRIPTION OF THE EMBODIMENTS

Figure 1A:
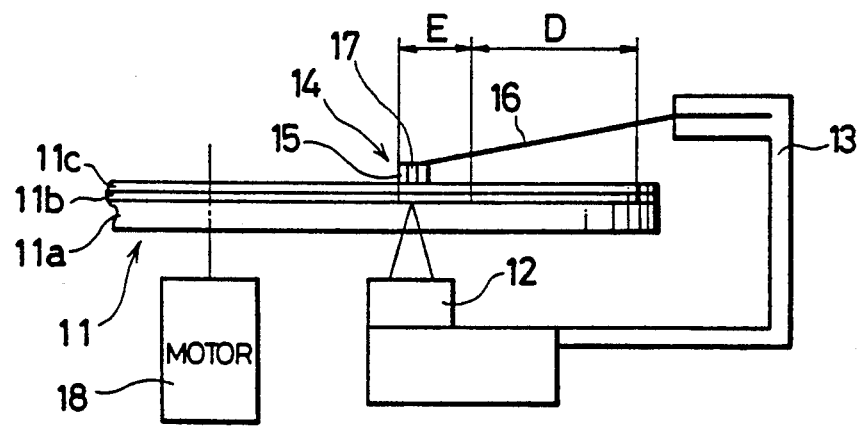
FIGS. 1(a) through 1(c) are schematic side views showing individual magneto-optical disk devices having suspensions whose lengths are different from one another.
Figure 1B:
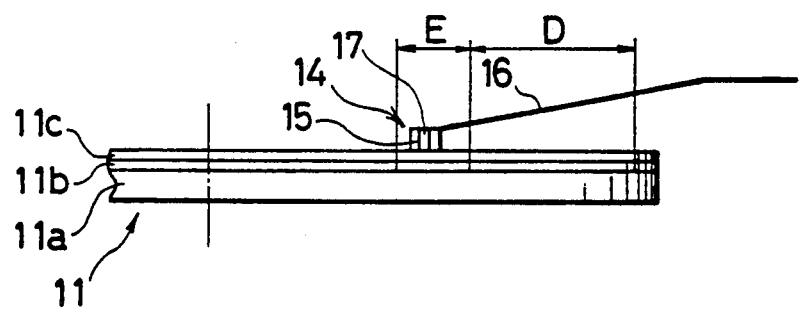
Figure 1C:
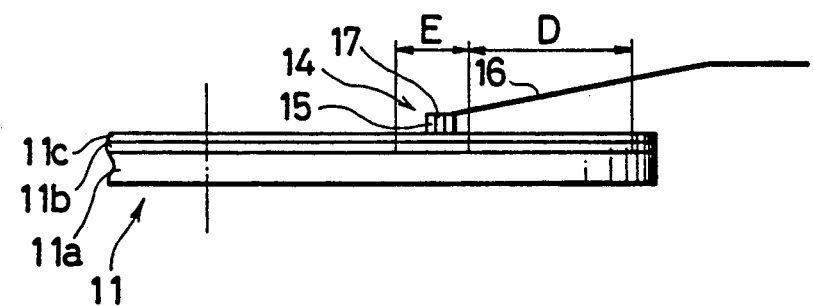
Figure 2:
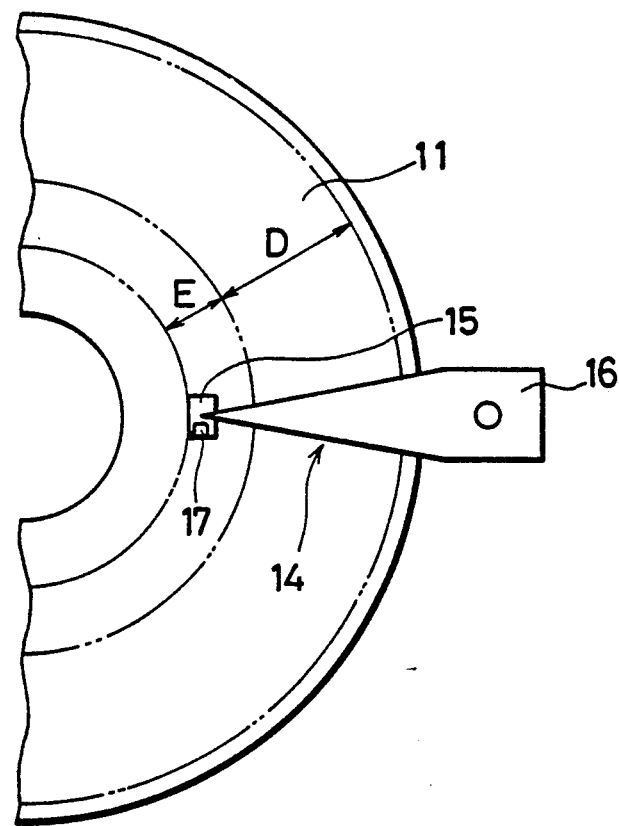
Figure 3:
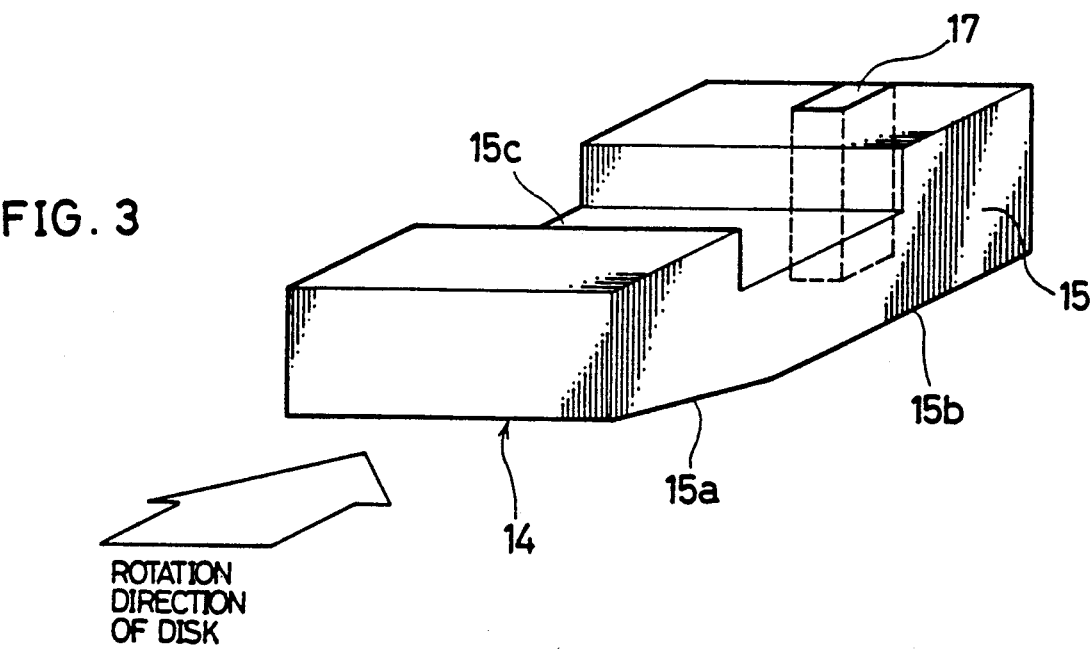

Referring to FIGS. 1 through 3, the following description will discuss one embodiment of the present invention.

As illustrated in FIG. 1(a) and FIG. 2, in a magneto-optical disk 11, a recording layer 11b having a vertically magnetized film is formed on a transparent substrate 11a, and covered with a protection layer 11c made of ultraviolet hardening resin or other material. The substrate 11a is made of a material having light transmission property such as glass, polycarbonate or amorphous polyolefin. Further, a guiding groove (not shown) for guiding a light beam, pits (not shown) for indicating addresses, etc. are predeterminately formed on the substrate 11a.

The recording layer 11b has a four-layer structure wherein, for example, in due order from the substrate 11a, an AlN film (800 Å in thickness) as a first transparent dielectric film, a DyFeCo film (200 Å in thickness) as a vertically magnetized film, an AlN film (250 Å in thickness) as a second transparent dielectric film and an Al film (500 Å in thickness) as a reflection film are laminated by means of spattering or other method.

In order to form the protection layer 11c, for example, a mixture of urethane acrylate and acrylic ester monomer (300 cps in viscosity) is first applied to the recording layer 11b by means of spin-coat method or other method. Then, the mixture is irradiated by ultraviolet rays having an intensity of substantial 600 mJ/cm$^2$, and thereby hardened to form the protection layer 11c.

The magneto-optical disk 11 has a recording area D whereon recordings are made and a sliding area E located an inner section from the recording area D. An inner section from the sliding area E in the vicinity of the central part forms a chucking area for a motor 18. In order to reduce friction between the protection layer 11c within the sliding area E and a floating slider 15 which will be described later, for example, fine protrusions and recessions are formed on the surface of the protection layer 11c within the sliding area E by the use of lapping paper with substantial 3000 meshes, or a lubricant such as perfluoropolyether (for example, brand name "Krytox" manufactured by du Pont Co.) is applied thereto. Additionally, it is only necessary to provide the recording layer 11b at least on the recording area D, and not necessary to provide it on the sliding area E.

A magneto-optical disk device for recording and reproducing data on and from the magneto-optical disk 11 is provided with an optical head 12 and a floating-type magnetic head 14 that is connected to the optical head 12 through a substantially U-shaped arm member 13. The optical head 12 incorporates a laser light source for projecting a light beam during recording/reproduction and a light receiving element for receiving light reflected from the magneto-optical disk 11 during recording/reproduction.

As illustrated in FIG. 3, the floating-type magnetic head 14 has a floating slider 15 which slides on the sliding area E. The floating slider 15 is made of, for example, ceramic such as CaTiO$_3$. The floating slider 15 has an inclined face 15a at the front end portion, which directly faces the rotation direction of the disk. The inclined face 15a is formed for leading air between the floating slider 15 and the magneto-optical disk 11, and its tilt angle is set to be within 10°. Further, a bottom face 15b of a successive rear portion from the inclined face 15a is made flat so that the floating slider 15 can maintain a stable floating state by receiving a floating force from air introduced from the inclined face 15a.

At a middle portion in the lengthwise direction on the top face of the floating slider 15, is formed a mounting groove 15c crossing the top face. One end of a suspension 16 for depressing the floating slider 15 toward the magneto-optical disk 11 is fixed to the mounting groove 15c. The other end of the suspension 16 is supported by the arm member 13 (see FIG. 1(a)).

A magnetic head 17 is installed in the vicinity of the rear end portion of the floating slider 15. The magnetic head 17 has a core made of, for example, MnZn ferrite, and a coil wound around the core. Additionally, the magneto-optical disk 11 is rotatively driven by a motor 18 shown in FIG. 1(a).

Moreover, in order to prevent abrasion of the sliding area E from being concentrated on the same radial position, each of the magneto-optical disk devices is designed so as to have a different radial position for starting floating (that is, a radial position for starting sliding) of the floating slider 15 within the sliding area E depending on individual magneto-optical disk devices.

Figure 11A:
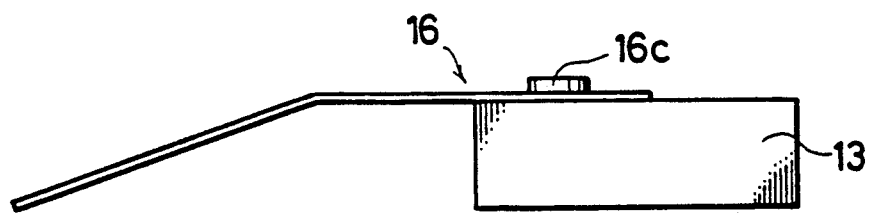
FIGS. 11(a) through 11(c) are side views respectively showing installation positions of suspensions to respective arms of FIGS. 1(a) through 1(c).
Figure 11B:
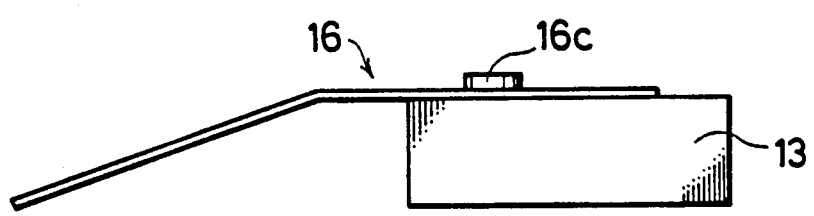
Figure 11C:
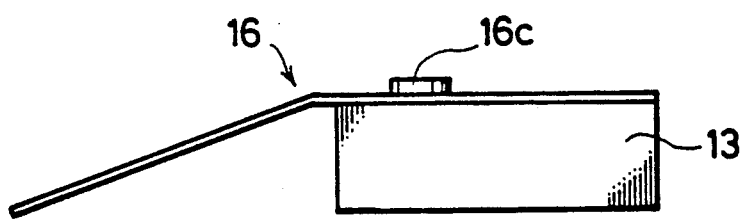
Figure 12A:
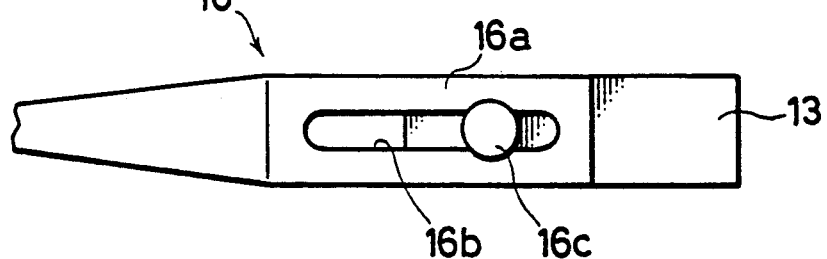
FIGS. 12(a) through 12(c) are plan views respectively showing installation positions of suspensions to respective arms of FIGS. 1(a) through 1(c).
Figure 12B:
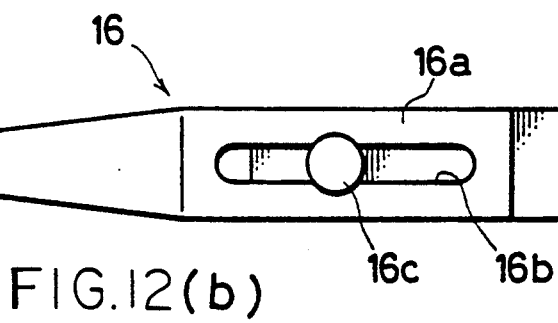
Figure 12C:
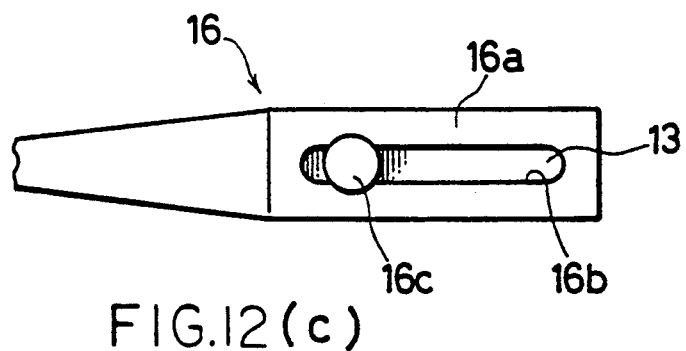

As is illustrated in FIGS. 12(a) through 12(c) as a first operative example, a slit 16b for providing a variable installation position is formed in a base portion 16a of the suspension 16 to be fixed to the arm member 13. The base portion 16a is secured to the arm member 13 by an fixing member 16c inserted in the slit 16b. Therefore, by varying a sliding amount of the base portion 16a in relation to the fixing member 16c depending on individual magneto-optical disk devices, the installation position of the base portion 16a is changed. With this arrangement, since the length from the fixing member 16c to the floating-type magnetic head 14 fixed to the other end of the suspension 16 can be changed (see FIGS. 11(a) through 11(c)), the radial position for starting sliding of the floating slider 15 is altered depending on those individual disk devices. Here, the distance between a refuge position of the floating-type magnetic head 14 in the stationary state of the magneto-optical disk 11 and a radial position for starting sliding of the floating-type magnetic head 14 upon recording or reproduction, is set to be constant regardless of individual magneto-optical disk devices.

Figure 13A:
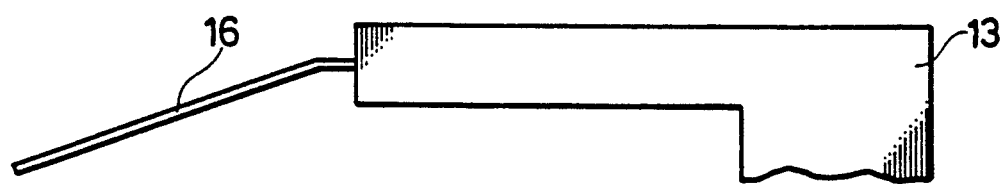
FIGS. 13(a) through 13(c) are schematic side views respectively showing arm members having modified arm lengths, whereto respective suspensions of FIGS. 1(a) through 1(c) are fixed.
Figure 13B:
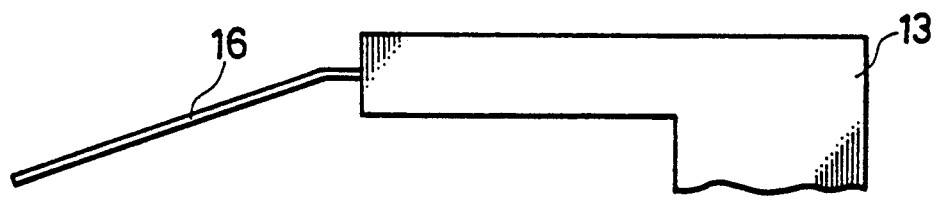
Figure 13C:
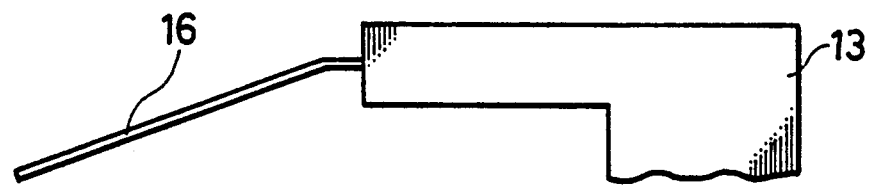

Further, as a second operative example, as is illustrated in FIGS. 13(a) through 13(c), the arm length of the arm member 13 sticking out in the horizontal direction for supporting base portion 16a may be changed depending on individual magneto-optical disk devices. That is, as is shown by these examples, any arrangement may be adopted as long as it changes the length of an orthogonal projection of the suspension 16 and arm member 13 supporting the suspension 16 that is projected on the surface of the magneto-optical disk 11, depending on individual magneto-optical disk devices.

Moreover, as a third operative example, an arrangement may be adopted, wherein data for positions for starting sliding and stopping sliding of the floating-type magnetic head 14 are stored in a memory such as ROM and changed depending on individual magneto-optical disk devices.

In the arrangement of the first operative example, when the magneto-optical disk 11 is placed in a predetermined station in a magneto-optical disk device, the floating slider 15 is moved to a radial position for starting sliding within the sliding area E. For example, as illustrated in FIG. 11(a), in the case of fixing the suspension 16 to the arm member 13 so as to have a longer-suspension structure, the radial position for starting sliding is shifted inward within the sliding area E as is shown in FIG. 1(a) since the distance which the floating-type magnetic head 14 travels from the refuge position to the radial position for starting sliding is set to be constant regardless of individual magneto-optical disk devices. On the other hand, as illustrated in FIG. 11(c), in the case of fixing the suspension 16 to the arm member 13 so as to have a shorter-suspension structure, the radial position for starting sliding is shifted outward within the sliding area E as is shown in FIG. 1(c). Further, if the suspension 16 has the intermediate structure between the above two cases in its length, the radial position for starting sliding is situated at midpoint within the radial range of the sliding area E as shown in FIG. 1(b).

In addition, the same results as the above can be also obtained according to either the second or third operative example.

After the floating slider 15 has been moved to the radial position for starting floating, the motor 18 starts rotatively driving the magneto-optical disk 11. As the rotation speed increases, the floating slider 15 receives a floating force from air flowing between the magneto-optical disk 11 and the floating slider 15. Then, the floating force just balances the depressing force of the suspension 16 exerted on the floating slider 15 in the direction opposite to the floating force. Thus, the floating-type magnetic head 14 is permitted to float above the magneto-optical disk 11 with a constant gap of, for example, substantial several $\mu$m to several tens $\mu$m.

Next, with the floating-type magnetic head 14 floating, the floating-type magnetic head 14 and optical head 12 are shifted to a desired radial position in the recording area D, and a laser beam having an laser output of substantial 2.5 to 6 mW is projected and converged on the recording layer 11b of the magneto-optical disk 11 from the optical head 12. Thus, the temperature of the irradiated portion of a vertically magnetized film made of such a material as DyFeCo in the recording layer 11b is raised to the vicinity of the Curie temperature (or to a temperature at which the coercive force becomes substantial zero). Next, a magnetic field reversing its direction between upward and downward with respect to a film surface of the vertically magnetized film in response to information to be recorded, is applied to the irradiated portion from the magnetic head 17. Thus, information can be recorded by means of the overwriting method which obviates the necessity of erasing operations for already recorded information.

On the other hand, the information thus recorded is reproduced by the following mechanism: A linearly polarized light beam having an laser output of substantial 0.5 to 1.0 mW is projected and converged on the recording layer 11b from the optical head 12, and reproduction is performed by detecting rotation directions of a plane of polarization of light reflected from the recording layer 11b.

When a recording or reproducing operation is completed with respect to the magneto-optical disk 11 or when the magneto-optical disk 11 is removed from the device, the floating slider 15 is returned to the original radial position for starting floating within the sliding area E, and then the motor 18 is stopped in rotation. Thus, the floating slider 15, after sliding at the radial position for starting floating within the sliding area E, is stopped with a stoppage of the rotation of the magneto-optical disk 11.

With the above-mentioned arrangements, in the case where one magneto-optical disk 11 is to be used in a plurality of magneto-optical disk devices, abrasion within the sliding area E can be dispersed without being concentrated on the same radial position since the radial position for starting floating of the floating slider 15 is different depending on individual magneto-optical disk devices. Therefore, the longevity of the magneto-optical disk 11 can be extended, and that of the magnetic head 17 can be also extended since sticking of the floating slider 15 and damage of the magnetic head 17 are prevented.

Figure 4:
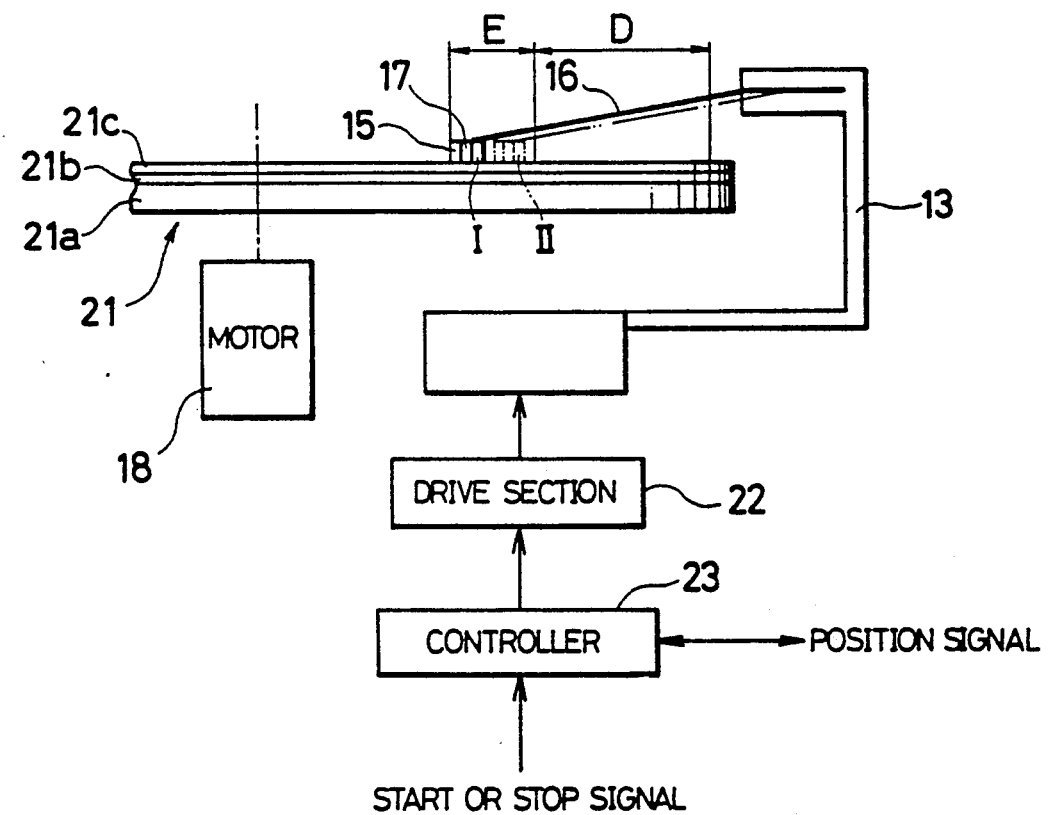
FIGS. 4 and 5 show another embodiment of the present invention.
Figure 5:
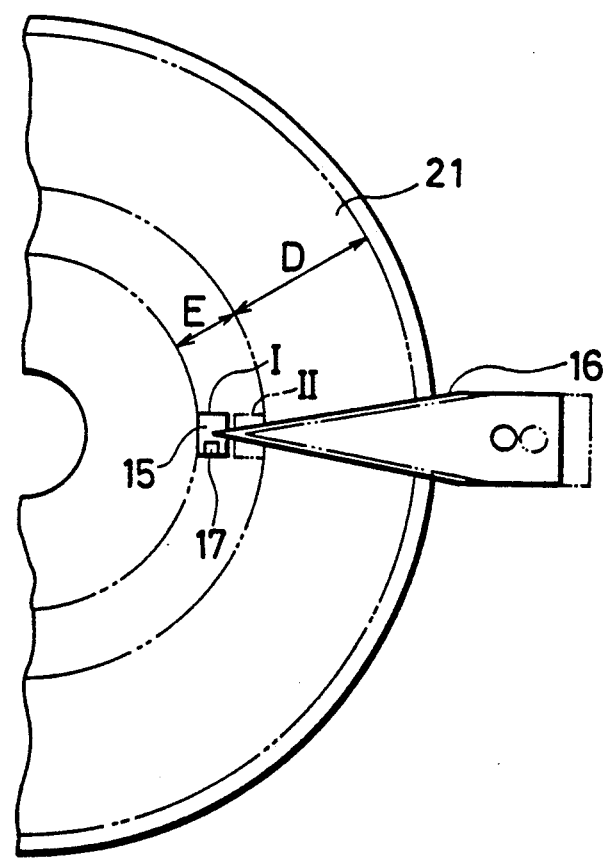

Referring to FIGS. 4 and 5, the following description will discuss a second embodiment. As illustrated in FIGS. 4 and 5, the second embodiment deals with a magnetic disk device for recording and reproducing on and from a commonly used magnetic disk 21 without employing an optical head.

The magnetic disk 21 is provided with a substrate 21a, a magnetic recording layer 21b formed on the substrate 21a and a protection layer 21c coating the magnetic recording layer 21b. In order to fabricating the substrate 21a, for example, a disc made of Al-Mg alloy or Al is prepared, and after fully polishing the disc, a bed made of substance of Ni-P composition is formed on the disc. Then, the bed is subjected to a mechanical texture processing by the use of lapping paper with 3000–6000 meshes, or to a chemical texture processing such as an oxidation processing (such as so-called alumite processing). Any treatment may be adopted as long as the peak height of the texture formed ranges within 200–500 Å.

By successively forming a Co-Cr-Ta film (500 Å in thickness) and a carbon film (200 Å in thickness) on the substrate 21a by means of spattering, a magnetic recording layer 21b and a protection layer 21c are fabricated. Further, in order to improve lubricity of the surface of the magnetic disk 21 and reduce sticking and abrasion between the magnetic disk 21 and the floating-type magnetic head 14, a lubricant such as perfluoropolyether (not shown) is applied to the protection layer 21c.

As with the first embodiment, the magneto-optical disk 21 has a recording area D and a sliding area E disposed in an inner section from the recording area D, and the magnetic recording layer 21b is formed at least on the recording area D while sliding of the floating slider 15 is performed only within the sliding area E whereon no recordings are made. In the present embodiment, especially, a radial position for starting sliding and a radial position for stopping sliding are arranged to alternately change between a radial position I and a radial position II in FIGS. 4 and 5, as will be described later.

The floating-type magnetic head 14 (see FIG. 3) for recording and reproducing on and from the magnetic disk 21 basically has the same configuration as that of the first embodiment (those of the portions having the same functions and described in the first embodiment are indicated by the same reference numerals and the description thereof is omitted). Here, in this embodiment, the floating slider 15 supported by the suspension 16 is made of ceramic such as Al$_2$O$_3$-TiC, ferrite or other material. Further, since the floating height of the floating slider 15 is generally set to be smaller in the magnetic disk than in the magneto-optical disk, a groove (not shown in FIG. 3) substantially parallel to the rotation direction of the magnetic disk 21 is formed on the bottom face 15b of the floating slider 15, if necessary.

The arm member 13 supporting the suspension 16 is adapted to be moved in a radial direction of the magnetic disk 21 by a drive section 22. Further, a controller 23 is connected to the drive section 22. Upon receiving a start signal for indicating actuation of the motor 18 or a stop signal for indicating stoppage of the motor 18, the controller 23 supplies the drive section 22 with a drive signal for shifting the floating-type magnetic head 14 to the radial position for starting sliding or the radial position for stopping sliding, in response to a position signal from a detection section, not shown, for detecting a radial position of the floating-type magnetic head 14. In addition, two reference levels are set in the controller 23, which are compared with a position signal supplied by the detection section so as to alternately change the radial position for starting sliding and the radial position for stopping sliding between the radial position I and the radial position II within the sliding area E. One of the reference levels corresponds to the radial position I, and the other of the reference levels corresponds to the radial position II.

In the above arrangement, when the power source of the magnetic disk device is turned on, the motor 18 starts rotatively driving the magnetic disk 21. Then, the floating slider 15, after sliding at the radial position I indicated by a solid line within the sliding area E, floats above the magnetic disk 21 while maintaining a gap of substantial 0.1 $\mu$m to several $\mu$m therebetween, as the rotation speed of the magnetic disk 21 increases. The floating height is determined by a balance between an upward lift caused by an air flow and a downward depressing force by the suspension 16.

Under there conditions, the floating slider 15 is moved to a desired radial position within the recording area D, and a high-frequency magnetic field reversing its direction in response to data to be recorded, is applied to the magnetic recording layer 21b, thereby permitting the data to be recorded. On the other hand, the data thus recorded is reproduced by the magnetic head 17 utilizing the fact that density of magnetic flux on the magnetic recording layer 21b is different between a recorded area and an unrecorded area.

When the rotation of the magnetic disk 21 is to be stopped, the drive section 22 moves the floating slider 15 to the radial position II within the sliding area E, indicated by an alternate long and two short dashes line, according to an instruction released from the controller 23. Under this condition, as the rotation speed of the motor 18 is gradually decreased, the floating slider 15, after sliding on the sliding area E, stops on the sliding area E with the stoppage of the rotation of the motor 18. Thus, the sliding of the floating slider 15 in the completion of the rotation of the magnetic disk 21 is performed at the radial position II that is different from the radial position I at which the sliding in the start is performed.

In addition, after the floating slider 15 have slid and stopped at the radial position II, when the rotation of the magnetic disk 21 is resumed, the floating slider 15, this time, slides at the radial position II and floats thereabove, and then slides and stops at the radial position I in the following stopping operation. Thereafter, every time the rotation of the magnetic disk 21 is resumed, the radial position for starting sliding of the floating slider 15 alternately changes between the radial positions I and II. Consequently, the radial position for stopping sliding is allowed to be different from the preceding radial position for starting sliding.

Figure 14:
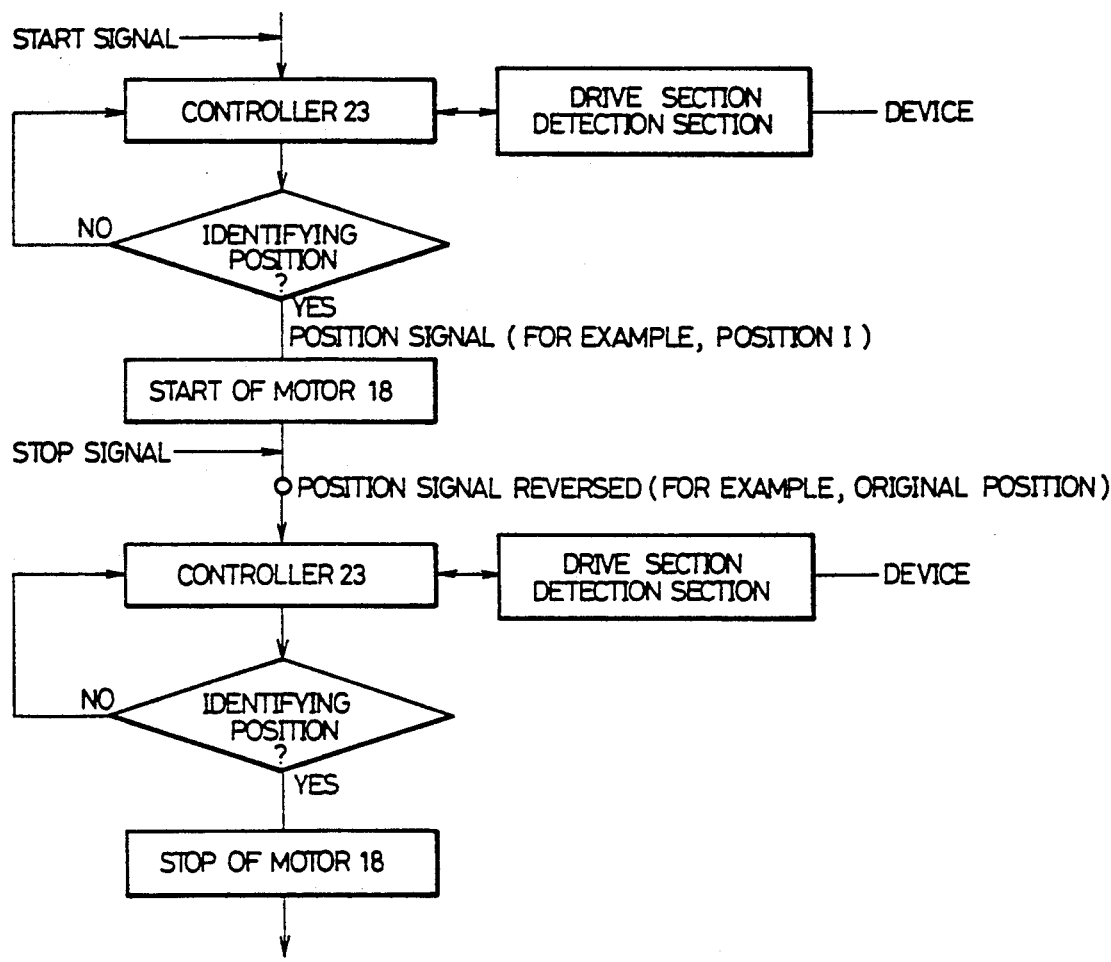
FIG. 14 is a flow chart showing a routine for controlling a radial position for sliding of the floating-type magnetic head of FIG. 4.

A flow chart of FIG. 14 shows control operation with respect to the radial position for starting sliding and the radial position for stopping sliding. Upon receiving the start signal, the controller 23 first selects, for example, the reference level I corresponding to the radial position I within the sliding area E. Next, the controller 23 compares a position signal supplied from the detection section with the reference level I, and keeps on supplying the drive section 22 with a drive signal for moving the floating-type magnetic head 14 to the radial position I until those two signals coincide with each other. When the two signals coincide with each other, the controller 23 sends to the motor 18 an instruction for starting the rotation. Thus, the floating-type magnetic head 14 is permitted to start sliding at the radial position I to float.

Next, upon receiving the stop signal, the controller 23 reverses its reference level. More specifically, the controller 23 selects the reference level II corresponding to the radial position II within the sliding area E instead of the above-mentioned reference level I. Then, as with the above-mentioned case, the controller 23 compares a position signal supplied from the detection section with the reference level II, and keeps on supplying the drive section 22 with a drive signal for moving the floating-type magnetic head 17 to the radial position II until those two signals coincide with each other. When the two signals coincide with each other, the controller 23 sends to the motor 18 an instruction for stopping the rotation. Thus, the floating-type magnetic head 14 is permitted to slide at the radial position II to stop.

Thereafter, if the controller receives the start signal again, the floating-type magnetic head 14 starts sliding at the radial position II to float, since the controller 23 has the reference level II set therein. With the next stop signal, since the controller 23 selects the reference level I instead of the reference level II, the floating-type magnetic head 14 stops after sliding at the radial position I. In this way, the radial position for starting sliding and the radial position for stopping sliding alternately change between the radial position I and the radial position II.

Additionally, there are two reference levels set in the above-mentioned case; and further it is possible to allow each reference level to have a predetermined range.

The present embodiment has been described on the magnetic disk device; yet, not limited to the magnetic disk device, it may as well be adopted for a magneto-optical disk device. In the magneto-optical disk device, since a magneto-optical disk is removable therefrom, the start and stop of the rotation are not necessarily performed in succession with the magneto-optical disk being kept in the device. Therefore, for example, the radial position I may be fixedly set as the radial position for starting sliding, while the radial position II may be fixedly set as the radial position for stopping sliding. In this case, data indicating the radial positions I and II may be stored in a memory such as ROM.

Figure 6:
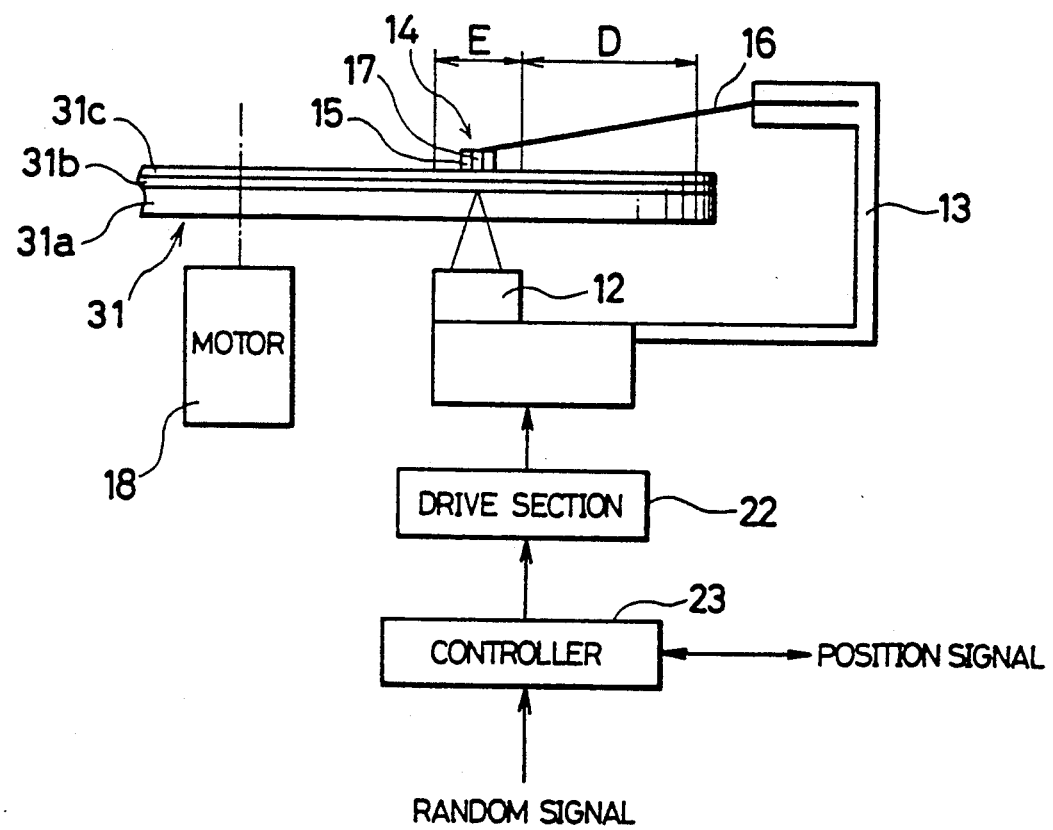
FIGS. 6 and 7 show still another embodiment of the present invention.
Figure 7:
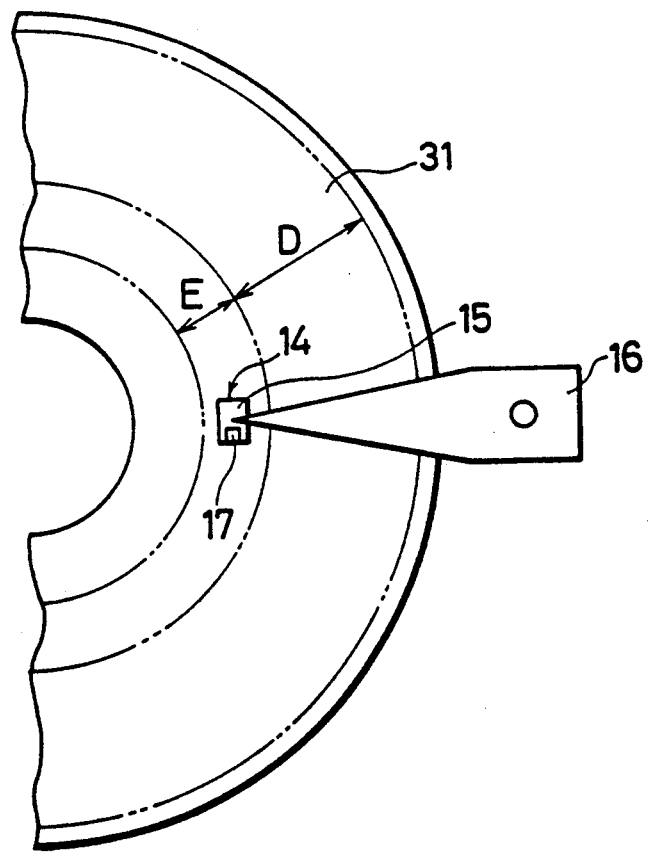
Figure 8:
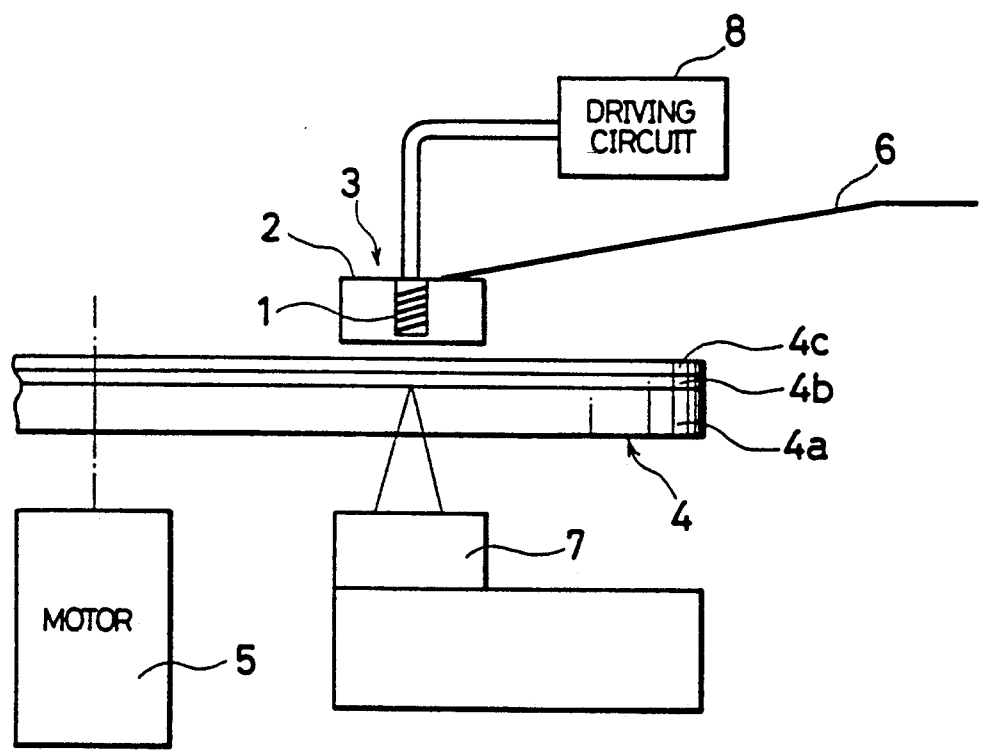
FIGS. 8 through 10 show the prior art.
Figure 9:
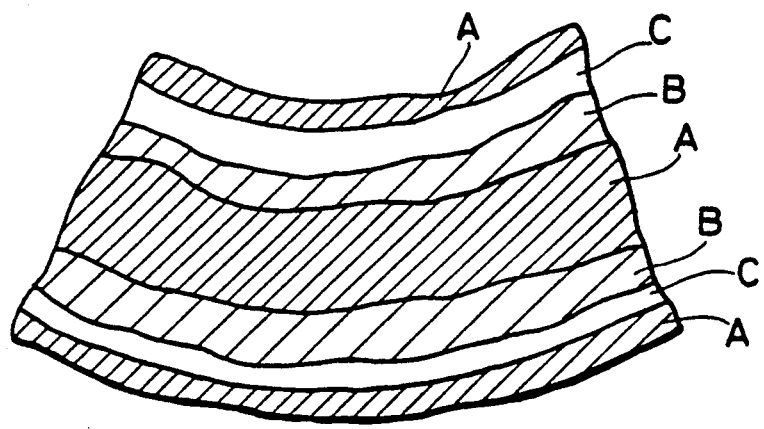
Figure 10:
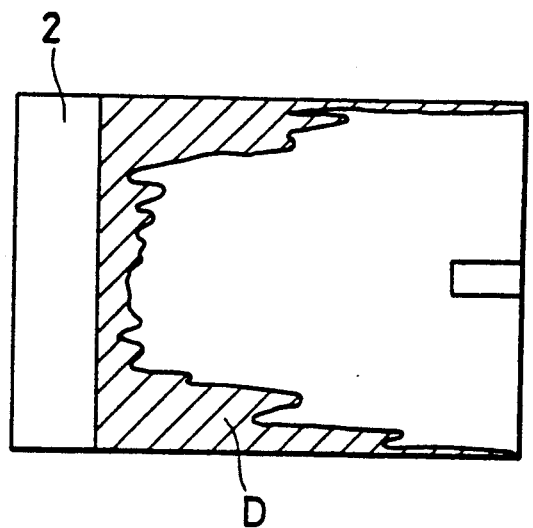

The following description will discuss a third embodiment. As shown in FIGS. 6 and 7, the present embodiment will be described on a magneto-optical disk device.

As illustrated in FIG. 6, a magneto-optical disk 31 has a transparent substrate 31a, a recording layer 31b formed on the substrate 31a and a protection layer 31c made of ultraviolet hardening resin or other material, for coating the recording layer 31b with. The recording layer 31b has a laminated structure wherein, for example, in due order from the substrate 31a, a first SiAlON film (800 Å in thickness), a TbFeCo film (1000 Å in thickness) as a vertically magnetized film and a second SiAlON film (800 Å in thickness) are formed. Further, onto the protection layer 31c, there is applied powder of polytetrafluoroethylene (for example, brand name "Lubron La" manufactured by Daikin Co., Ltd.) as a lubricant.

The floating-type magnetic head 14 and the optical head 12 have the same structures as those described in the first embodiment. Further, there are provided a drive section 22 for moving the floating-type magnetic head 14 together with the optical head 12 in the radial direction of the magneto-optical disk 31 and a controller 23 for supplying the drive section 22 with a drive signal.

A random signal for determining the radial position for starting sliding or the radial position for stopping sliding is generated by a random number generator, not shown, and released to the controller 23. A trigger signal for allowing the random number generator to generate a random signal may be a detection signal of a sensor (not shown) for detecting whether or not the magneto-optical disk is placed in a predetermined station in the device or may be the aforementioned start signal or stop signal. Data indicating a radial position within the sliding area E corresponding to the random signal is stored in, for example, a radial position setting means such as a table ROM, not shown.

In the above arrangement, when the magneto-optical disk 31 is placed in the magneto-optical disk device, a random signal is sent from the random number generator to the controller 23. The controller 23 reads out radial position data corresponding to the random signal from the table ROM, and supplies the drive section 22 with a drive signal based on the radial position data. A radial position for starting sliding within the sliding area E is thus determined according to the random signal, and consequently the floating slider 15 is moved to the determined radial position by the drive section 22. In this state, the magneto-optical disk 31 starts rotating, and the floating slider 15 slides on the sliding area E to float. Thereafter, the floating slider 15 and the optical head 12 are moved to a desired radial position on the recording area D, thereby permitting recording or reproduction to be executed.

When the rotation of the magneto-optical disk 31 is to be stopped, the floating slider 15 may be returned to the radial position for starting sliding, or a radial position for stopping sliding within the sliding area E may be newly determined according to a random signal that has been again entered to the controller 23. In any case, the rotation of the motor 18 is stopped after making the floating slider 15 move to the radial position randomly determined for stopping sliding by means of the drive section 22.

In the present embodiment, since the radial position for starting sliding or radial position for stopping sliding is arranged to randomly vary in response to the random signal, abrasion due to the sliding of the floating slider 15 is randomly dispersed within the sliding area E. This results in long life of the floating-type magnetic head 14 and the magneto-optical disk 31.

Additionally, the present embodiment, not limited to the magneto-optical disk device, may be adopted for commonly used magnetic disk devices.

As described above, the magnetic disk device of the present invention permits sliding operations of the floating-type magnetic head to be performed within the sliding area provided outside the recording area on the magnetic disk upon starting the rotation of the magnetic disk and stopping the rotation thereof, and varies a radial position for starting sliding or a radial position for stopping sliding.

With the arrangement, since the radial position for sliding of the floating-type magnetic head is varied within the sliding area without being located at the same position, abrasion within the sliding area can be dispersed, and abrasion loss is reduced. Therefore, it becomes possible to extend the longevities of the floating-type magnetic head and magnetic disk.

Further, by providing a control means which alternately changes the radial position for starting sliding and the radial position for stopping sliding of the floating-type magnetic head between two radial positions preliminarily determined, controlling of the radial positions for sliding can be performed more easily, thereby reducing the abrasion of the sliding area.

Furthermore, the magnetic disk device provided with a control means which randomly varies the radial position for starting sliding and the radial position for stopping sliding, can further reduce the abrasion of the sliding area and the floating-type magnetic head.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magnetic disk device having a floating-type magnetic head for use with a disk-shaped recording medium which is adapted to be removed from the magnetic disk device and has a sliding area for the floating-type magnetic head formed outside a recording area thereof; said magnetic disk device comprising:
   a suspension means for supporting the floating-type magnetic head and applying an elastic force to the floating-type magnetic head when the floating-type magnetic head floats above the recording medium; and
   fixing means whereto the suspension means is fixed,
   wherein a radial position for sliding of the floating-type magnetic head on the recording medium is varied depending on individual magnetic disk devices by changing lengths of the suspension means and the fixing means in a radial direction of the recording medium depending on individual magnetic disk devices.

2. The magnetic disk device as set forth in claim 1, wherein the suspension means comprises a base portion to be attached to the fixing means, said base portion having a slit for providing a variable installation position for the suspension means; and
   the fixing means comprises a fixing member for attaching the base portion with, the fixing member being inserted in the slit,
   wherein the radial position for sliding of the floating-type magnetic head on the recording medium is varied depending on individual magnetic disk devices by changing a sliding amount of the base portion with respect to the fixing member.

3. The magnetic disk device as set forth in claim 1, wherein the fixing means comprises an arm sticking out in the radial direction of the recording medium, whereto the suspension means is fixed,
   wherein the radial position for sliding of the floating-type magnetic head on the recording medium is varied depending on individual magnetic disk devices by changing a length of the arm.

4. A magneto-optical disk having a floating-type magnetic head, for use with a disk-shaped magneto-optical recording medium having a sliding area for the floating-type magnetic head formed outside a recording area thereof; said magneto-optical disk device comprising:
   drive means for moving the floating-type magnetic head in the radial direction of the magneto-optical recording medium; and
   control means for inputting a random signal based on random numbers when the magneto-optical recording medium is placed in the magneto-optical disk drive, for setting data indicating a radial position corresponding to the random signal, and
   for releasing to the drive means a drive signal for moving the floating-type magnetic head in the radial direction within the sliding area according to the data,
   whereby the radial position for sliding of the floating-type magnetic head is randomly varied within the sliding area in every rotation start and end of the recording medium.

5. The magnetic disk device as set forth in claim 4, wherein the radial position setting means is a table ROM with the data stored therein; and
   the control means, further connected to the random number generating means, reads out from the table ROM data corresponding to the random signal received from the random number generating means.

6. The magnetic disk device as set forth in claim 4, further comprising:
   a sensor for detecting that the recording medium is placed in a predetermined station in the magnetic disk device,
   wherein the random number generating means generates the random signal when a detection signal of the sensor is entered thereto.

7. The magnetic disk device as set forth in claim 4, further comprising a rotation drive means for rotating the recording medium, wherein the random number generating means is arranged to generate the random signal upon receiving a start signal for instructing actuation of the rotation drive means or a stop signal for instructing stoppage of the rotation drive means.

8. A floating start-stop method for a floating-type magnetic head on a recording medium having a sliding area for the floating-type magnetic head formed outside a recording area thereof, comprising the steps of:
   permitting the floating-type magnetic head to slide at a first radial position within the sliding area so as to float;
   moving the floating-type magnetic head to a desired radial position within the recording area for recording or reproduction; and
   stopping the rotation of the recording medium to land the floating-type magnetic head at a second radial position within the sliding area, different from the first radial position, after having moved the floating-type magnetic head to the second radial position.

9. The floating start-stop method for a floating-type magnetic head as set forth in claim 8, further comprising the steps of:
permitting the floating-type magnetic head to slide at the second radial position within the sliding area so as to float when the rotation of the recording medium is resumed; and
stopping the rotation of the recording medium to land the floating-type magnetic head at the first radial position within the sliding area, after having moved the floating-type magnetic head to the first radial position.

10. A floating start-stop method for a floating-type magnetic head on a recording medium having a sliding area for the floating-type magnetic head formed outside a recording area thereof, comprising the step of:
randomly setting a floating start position and a floating stop position of the floating-type magnetic head within the sliding area.

11. A magnetic disk device having a floating-type magnetic head, for use with a disk-shaped recording medium having a sliding area for the floating-type magnetic head formed outside a recording area thereof, said magnetic disk device comprising:
rotation drive means for rotating the recording medium;
drive means for moving the floating-type magnetic head in the radial direction of the recording medium; and
control means for controlling the drive means so that every time the rotation drive means finishes rotating the recording medium, the floating-type magnetic head finishes sliding at a second radial position that is different from a first radial position at which the magnetic head has started sliding, the control means being connected to the drive means, the first radial position and the second radial position being included within said sliding area.

12. The magnetic disk device as set forth in claim 11, wherein the control means includes a controller for releasing to the drive means a drive signal which allows the floating-type magnetic head to move so that a radial position of the floating-type magnetic head coincides with the first radial position when the drive signal receives a start signal for calling for an activation of the rotation drive means, as well as for releasing to the rotation drive means an instruction for starting a rotation when the radial position coincides with the first radial position.

13. The magnetic disk device as set forth in claim 11, wherein the control means includes a controller for releasing to the drive means a drive signal which allows the floating-type magnetic head to move so that a radial position of the floating-type magnetic head coincides with the second radial position when the controller receives a stop signal for calling for a stop of the rotation drive means, as well as for releasing to the rotation drive means an instruction for stopping the rotation when the radial position coincides with the second radial position.

14. The magnetic disk device as set forth in claim 11, wherein the control means includes a storage means for storing the first radial position as a radial position at which the floating-type magnetic head starts sliding, as well as for storing the second radial position as a radial position at which the floating-type magnetic head finishes sliding.

15. The magnetic disk device as set forth in claim 14, wherein the radial position for sliding of the floating-type magnetic head on the recording medium is varied depending on individual magnetic disk devices by changing the radial position for starting sliding and radial position for stopping sliding to be stored in the memory means depending on individual magnetic disk devices.

16. The magnetic disk device as set forth in claim 11, wherein the sliding area is disposed in an inner section of the recording area, and further a chucking area for the rotation drive means is disposed in an inner section of the sliding area.

* * * * *